United States Patent [19]
Kim

[11] Patent Number: 5,883,977
[45] Date of Patent: Mar. 16, 1999

[54] METHOD AND APPARATUS FOR ENCODING A VIDEO SIGNAL OF A CONTOUR OF AN OBJECT

[75] Inventor: Jin-Hun Kim, Seoul, Rep. of Korea

[73] Assignee: Daewoo Electronics Co., Ltd., Seoul, Rep. of Korea

[21] Appl. No.: 775,038

[22] Filed: Dec. 30, 1996

[51] Int. Cl.[6] .................................................. G06K 9/48
[52] U.S. Cl. ........................ 382/242; 382/236; 382/238; 348/402; 348/413
[58] Field of Search ..................................... 382/238, 242, 382/199, 236, 250, 241; 348/413, 402, 403; 357/433

[56] References Cited

U.S. PATENT DOCUMENTS

| 5,103,488 | 4/1992 | Gemello et al. | 382/199 |
| 5,650,822 | 7/1997 | Heisler et al. | 348/402 |
| 5,691,769 | 11/1997 | Kim | 348/403 |
| 5,737,449 | 4/1998 | Lee | 382/242 |

FOREIGN PATENT DOCUMENTS

| 07203425 | 8/1995 | Japan | H04N 7/24 |
| 08205194 | 8/1996 | Japan | H04N 11/04 |
| 2296839 | 7/1996 | United Kingdom | H04N 5/14 |

OTHER PUBLICATIONS

Höetter M, "Object–Oriented Analysis–Synthesis Coding Based On Moving Two–Dimensional Objects" Signal Processing: Image Communication, vol. 2, No. 4, Dec. 1990, pp. 409–428.

Chuang Gu et al., "Contour Simplification and Motion Compensated Coding" Signal Processing: Image Communication, vol. 7, No. 4/6, Nov. 1995, pp. 279–296.

*Primary Examiner*—Jose L. Couso
*Assistant Examiner*—Anh Hong Do
*Attorney, Agent, or Firm*—Pennie & Edmonds LLP

[57] ABSTRACT

Previous vertices on a previous contour are mapped onto a current contour in this method to form a predicted vertex on the current contour corresponding to each of the previous vertices and vertex displacements between the previous vertices and their corresponding predicted vertices are calculated. After current vertices on the current contour being determined, the current contour is coded based on either the current vertices to thereby provide intra-coded data or the previous contour to provide inter-coded data; and either the intra-coded data or the inter-coded data is selected based on the vertex displacements as encoded data for the current contour.

15 Claims, 3 Drawing Sheets

METHOD AND APPARATUS FOR ENCODING A VIDEO SIGNAL OF A CONTOUR OF AN OBJECT

FIELD OF THE INVENTION

The present invention relates to a method and apparatus for encoding a contour of an object expressed in a video signal; and, more particularly, to a method and apparatus capable of reducing the amount of transmission data through the use of a contour motion estimation technique.

DESCRIPTION OF THE PRIOR ART

In digitally televised systems such as video-telephone, teleconference and high definition television systems, a large amount of digital data is needed to define each video frame signal since the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference system.

One of such techniques for encoding video signals for a low bit-rate encoding system is the so-called object-oriented analysis-synthesis coding technique, wherein an input video image is divided into objects and three sets of parameters for defining the motion, contour and pixel data of each object are processed through different encoding channels.

One example of such object-oriented coding scheme is the so-called MPEG(Moving Picture Experts Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV and the like) and surveillance(see, for instance, MPEG-4 Video Verification Model Version 2.0, International Organization for Standardization, ISO/IEC JTC1/SC29/WG11 N1260, March 1996).

According to MPEG-4, an input video image is divided into a plurality of video object planes (VOP's), which correspond to entities in a bitstream that a user can have access to and manipulate. A VOP can be referred to as an object and represented by a bounding rectangle whose width and height may be chosen to be smallest multiples of 16 pixels(a macroblock size) surrounding each object so that the encoder processes the input video image on a VOP-by-VOP basis, i.e., an object-by-object basis. The VOP includes color information consisting of the luminance component (Y) and the chrominance components (Cr, Cb) and contour information represented by, e.g., a binary mask.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods, such as polygonal approximation and B-spline approximation, to encode the contour information. One of the disadvantages in the polygonal approximation is the roughness of the representation of the contour. The B-spline approximation is, on the other hand, capable of representing the contour more precisely; however, it requires a high-order polynomial to reduce the approximation error, resulting in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

In an apparatus which adopts the contour approximation technique based on the polygonal approximation and the DST, as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertices are determined and the contour of an object is approximated through the use of polygonal approximation for fitting the contour by line segments. And, N sample points for each line segment are selected and an approximation error at each of the N sample points is calculated in order to obtain a set of approximation errors for each line segment, wherein each of the approximation errors represents the distance or displacement between each of the N sample points and the contour. Thereafter, a set of DST coefficients is generated by performing a one-dimensional DST operation on each set of approximation errors.

Even though the aforementioned DST based contour approximation technique is capable of alleviating the rough representation and computational complexity and reducing the volume of transmission data, it still remains desirable to further reduce the volume of transmission data.

SUMMARY OF THE INVENTION

It is, therefore, a primary object of the invention to provide an improved contour encoding method and apparatus which can be beneficially used to further reduce the amount of transmission data by employing a contour motion estimation technique based on a difference between a previous and a current contours.

In accordance with the invention, there is provided a method for encoding a video signal of a current contour of an object based on a previous contour thereof, the previous contour having a predetermined multiplicity of previous vertices thereon, the method comprising the steps of:

(a) mapping each of the previous vertices onto the current contour to form thereon a predicted vertex corresponding to said each of the previous vertices;

(b) calculating vertex displacements between respective previous vertices and their corresponding predicted vertices;

(c) determining a plurality of current vertices on the current contour;

(d) coding the current contour based on the current vertices to thereby provide intra-coded data;

(e) coding the current contour with reference to the previous contour to provide inter-coded data; and (f) selecting, as encoded data for the current contour, either the intra-coded data or the inter-coded data based on the vertex displacements.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
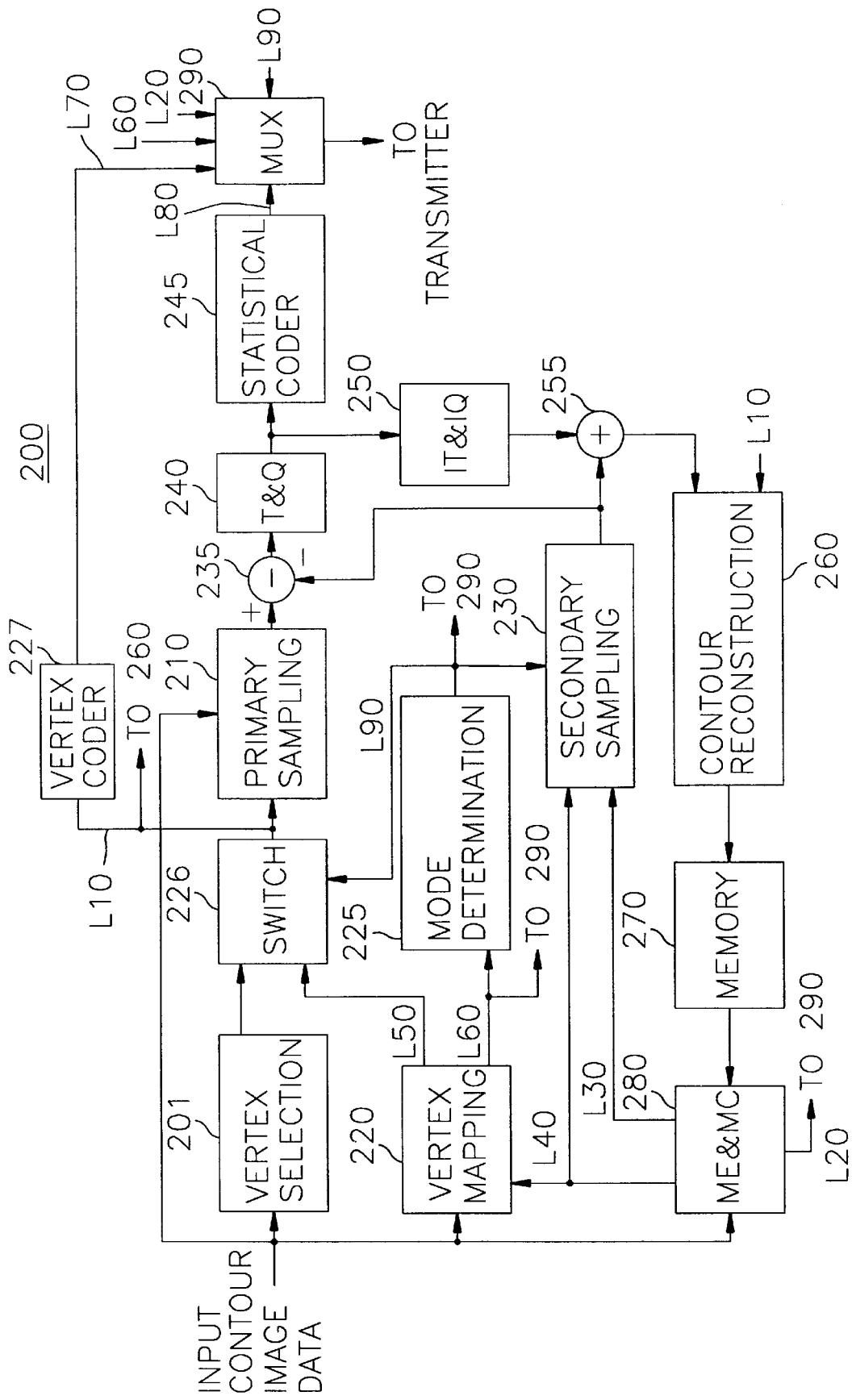
FIG. 1 represents a block diagram of an apparatus for encoding input contour image data in accordance with the present invention.

Referring to FIG. 1, there is shown a block diagram of an apparatus 200 for encoding input contour image data in accordance with the present invention, the input contour image data representing positions of contour pixels constituting a current contour of an object. The input contour image data is fed to a vertex selection block 201, a primary sampling block 210, a vertex mapping block 220 and a motion estimation and motion compensation(ME & MC) block 280. The vertex selection block 201 determines current vertices on the current contour through the use of a conventional polygonal approximation technique for fitting the current contour with a plurality of current line segments, wherein each current line segment is formed by connecting two current vertices disposed adjacent to each other along the current contour. From the vertex selection block 201, current vertex information representing positions of the current vertices are provided to a switch 226.

In the meantime, the ME & MC block 280 finds centroids for the current and a previous contours of the object by averaging the coordinates of all the pixel positions on the respective contours and computes a motion vector, i.e., global motion vector(GMV) denoting a spatial displacement between the centroids. The centroid of the current contour is calculated based on the input contour image data while the centroid of the previous contour is obtained based on previous contour image data retrieved from a memory 270, wherein the previous contour image data represents positions of contour pixels and vertices constituting the previous contour. Thereafter, a predicted contour is generated by overlapping the previous contour onto the current contour. In other words, at the ME & MC block 280, the predicted contour is provided by shifting all the pixels on the previous contour by GMV such that the centroid of the predicted contour coincides with that of the current contour. The previous vertices are also shifted by GMV at the MC & ME block 280 and provided as motion compensated vertices. From the ME & MC blocks 280, GMV is provided to a multiplexer (MUX) 290 via a line L20; predicted contour image data representing positions of the contour pixels of the predicted contour, to a secondary sampling block 230 via a line L30; and motion compensated vertex information representing positions of the motion compensated vertices, to the vertex mapping block 220 and the secondary sampling block 230 via a line L40.

In response to the motion compensated vertex information and the input contour image data, the vertex mapping block 220 determines a predicted vertex for each motion compensated vertex and calculates displacements therebetween, wherein the predicted vertex represents a contour pixel on the current contour nearest to each motion compensated vertex. Predicted vertex information representing positions of the predicted vertices are provided to the switch 226 via a line L50; and the vertex motion vectors representing the displacements between respective predicted vertex and their corresponding motion compensated vertex are provided to a mode determination block 225 and the MUX 290 via a line L60.

Figure 2:
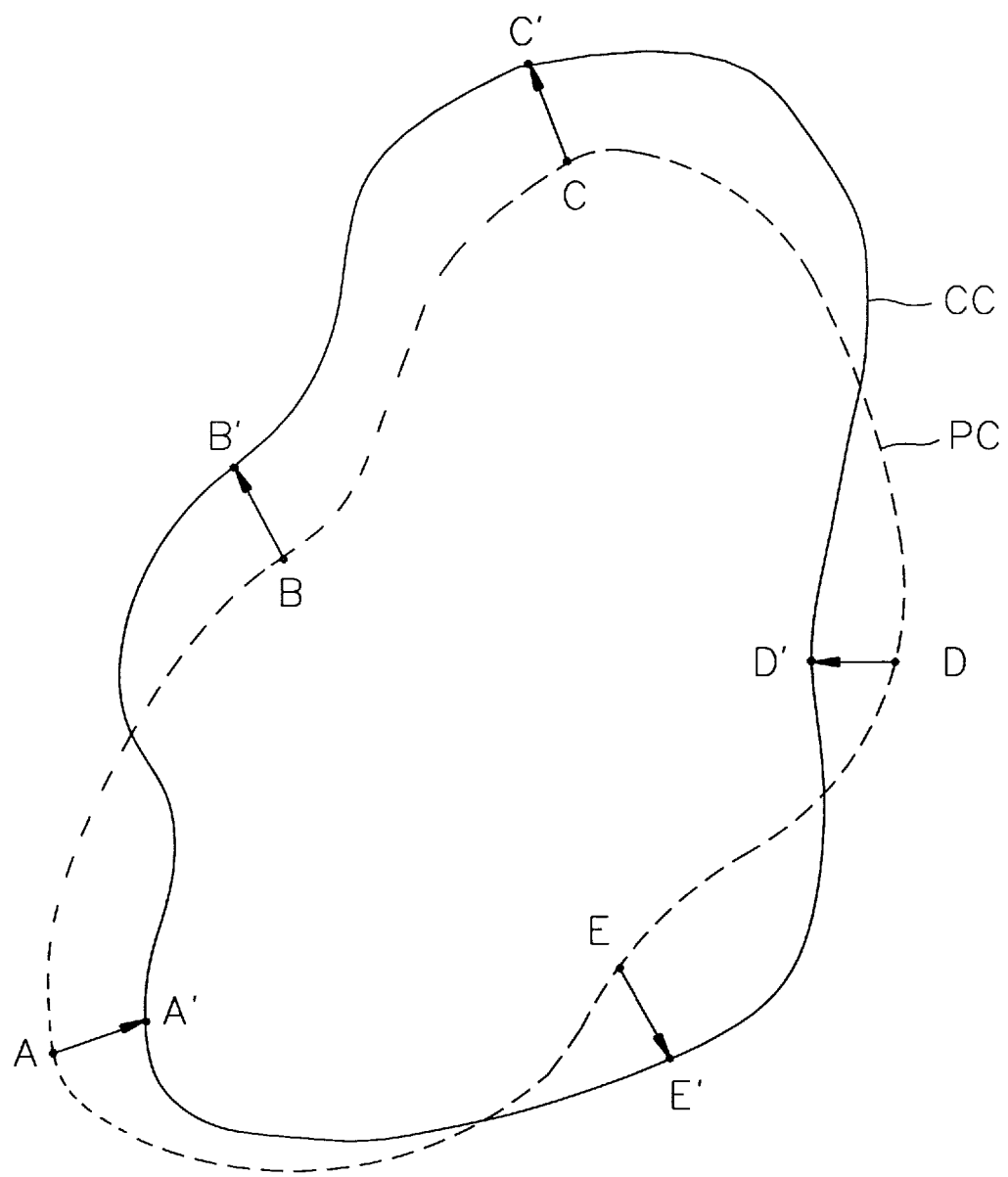
FIG. 2 provides an explanatory diagram for illustrating a vertex mapping procedure in accordance with the present invention.

Referring to FIG. 2, there is illustrated a vertex mapping process performed at the vertex mapping block 220, wherein CC represents a current contour and A to E denote motion compensated vertices on a predicted contour PC. As shown in the drawing, the motion compensated vertices A to E are mapped to the predicted vertices A' to E', respectively, each of the predicted vertices A' to E' being the closest point on the current contour CC to its corresponding motion compensated vertex.

Referring back to FIG. 1, the mode determination block 225 determines a coding mode of the current contour based on the vertex motion vector fed from the vertex mapping block 220. Specifically, in order to determine the coding mode, the mode determination block 225 calculates magnitudes of the vertex motion vectors to thereby compare each of the magnitudes with a predetermined threshold TH and counts the number of vertex motion vectors whose magnitudes are greater than the threshold TH. If the counted number is greater than or equal to a preset number P, P being a positive integer, it is regarded that the current and the previous contours differ significantly and a coding mode is set to be an intra-mode, wherein the current contour is coded without reference to the previous contour. On the other hand, if the counted number is smaller than the number P, it is determined that there is a close resemblance between the current and the previous contours, and, therefore, a coding mode for the current contour is decided to be an inter-mode, wherein the current contour is inter-coded based on the difference between the previous and the current contours.

The mode determination block 225 provides a first control signal to the switch 226, the secondary sampling block 230 and the MUX 290 if the intra mode is determined; and a second control signal, if otherwise.

In the intra-mode, in response to the first control signal from the mode determination block 225, the switch 226 selects the current vertices as vertices for the current contour and provides vertex data representing positions of the selected vertices to the primary sampling block 210, a vertex coder 227 and a contour reconstruction block 260 via a line L10, the vertex data in the intra-mode being identical to the current vertex information; and the secondary sampling block 230 provides a subtractor 235 and an adder 255 with zero-valued sets of secondary errors. At the vertex coder 227, the vertex data is coded by using any known vertex coding technique, e.g., an arithmetic coding scheme to generate coded vertex data and the coded vertex data is transmitted to the MUX 290 via a line L70.

At the primary sampling block 210, the selected, i.e., current vertices divide the current contour into a multiplicity of primary contour segments. Each primary contour segments represents a portion of the current contour connecting two adjacent selected vertices and contour pixels disposed therebetween; and is approximated by a primary line segment joining the two adjacent selected vertices. Thereafter, the primary sampling block 210 takes N sample points on each primary line segment in a predetermined manner and calculates a primary error at each sample point, to thereby provide a set of primary errors for each primary contour segment to the subtractor 235, wherein in a preferred embodiment of the invention, the sample points on a primary line segment are equi-distanced from each other with N being a positive integer. The primary error represents a displacement from a sample point to an intersection between the primary contour segment and a line drawn normal to the primary line segment from the sample point, the primary error including a distance between the sample point and the intersection and a sign indicating a relative position of the intersection with respect to the primary line segment.

At the subtractor 235, zero valued secondary errors are subtracted from primary errors of each set to provide a set of difference errors for each set of primary errors to a transform and quantization(T & Q) block 240. In the intra-mode, the secondary errors from the secondary sampling block 230 are all zero valued, and, accordingly, the difference errors are identical to the primary errors, respectively.

The T & Q block 240 transforms, by using a predetermined transform method, e.g., discrete sine transform(DST) or discrete cosine transform(DCT), and quantizes each set of difference errors, to thereby produce a set of quantized transform coefficients for each set of difference errors. Each set of quantized transform coefficients is transferred from the T & Q block 240 to a statistical coder 245 and an inverse transform and inverse quantization (IT & IQ) block 250. At the statistical coder 245, each set of quantized transform coefficients is coded by using a conventional statistical coding schemes, e.g., VLC(variable length coding) technique. Encoded error data for the sets of quantized transform coefficients is provided from the statistical coder 245 to the MUX 290 via a line L80. In the intra-mode, the first control signal is fed to the MUX 290 via a line L90. In response thereto, the MUX 290 selects the encoded error data on the line L80 and the encoded vertex data on the line L70; and provides same as encoded contour data for the current contour to a transmitter (not shown) for the transmission thereof.

In the meantime, at the IT & IQ block 250, each set of quantized transform coefficients is converted into a set of reconstructed difference errors which is provided therefrom to the adder 255, wherein each set of reconstructed difference errors is converted to a set of reconstructed primary errors and the set of reconstructed primary errors is provided to the contour reconstruction block 260. In the intra-mode, respective reconstructed primary errors are identical to their corresponding reconstructed difference errors since the secondary errors inputted thereto from the secondary sampling block 230 are all zero valued. At the contour reconstruction block 260, the current contour is reconstructed based on the vertex data on the line L10 and the set of reconstructed primary errors and reconstructed current contour image data are provided to the memory 270 to be stored therein as a previous contour image data for a next contour, wherein the reconstructed current contour image data includes position information of vertices and contour pixels of the reconstructed current contour.

In the inter-mode, the mode determination block 225 issues the second control signal on the line L90 to load it to the switch 226, the secondary sampling block 230 and the MUX 290. In response to the second control signal, the switch 226 selects the predicted vertices as vertices for the current contour and provides vertex data representing positions of the selected vertices on the line L10. The vertex data is identical to the predicted vertex information in the case of the inter-mode.

At the primary sampling block 210, the current contour is divided into a plurality of primary contour segments by the selected, i.e., predicted vertices. Each primary contour segment in the inter-mode represents a portion of the current contour connecting two adjacent predicted vertices and contour pixels disposed therebetween and is approximated by a primary line segment joining the two adjacent predicted vertices. Thereafter, a set of primary errors is obtained in an identical manner as in the intra-mode.

Meanwhile, in response to the second control signal from the mode determination block 225, the secondary sampling block 230 determines sets of secondary errors with respect to the predicted contour and the motion compensated vertices thereon, in a same manner as in the primary sampling block 210. That is, the predicted contour is divided into a multiplicity of secondary contour segments, each of which being approximated by a secondary line segment joining two motion compensated vertices positioned at the ends of the secondary contour segment; and each set of secondary errors represents N number of displacements between a secondary contour segment and its corresponding secondary line segment, computed in the manner described above with reference to the primary sampling block 210. The sets of secondary errors are provided to the subtractor 235 and the adder 255.

Figure 3A:
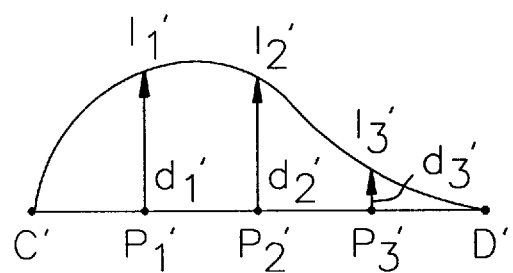
FIGS. 3A and 3B show a primary and a secondary sampling procedures, respectively, in accordance with the present invention.
Figure 3B:
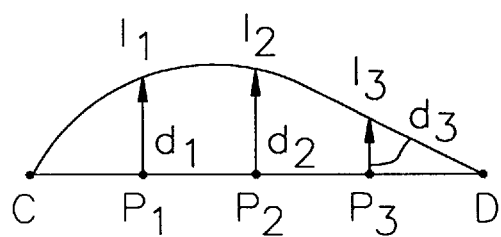

As illustrated in FIG. 2, the motion compensated vertices A to E on the predicted contour PC and the predicted vertices A' to E' on the current contour CC are in a one-to-one correspondence with each other; and, accordingly, each primary contour segment, e.g., contour segment C'D', corresponds to a secondary contour segment, e.g., contour segment CD. At the is subtractor 235, a set of secondary errors for each secondary contour segment is subtracted from a set of primary errors for a corresponding primary contour segment. For instance, as depicted in FIGS. 3A and 3B, if primary errors for the primary contour segment C'D' are determined as $d_1',d_2'$ and $d_3'$ and secondary errors for the secondary contour segment CD are calculated as $d_1, d_2, d_3$, a $d_i$ is subtracted from a $d_i'(i=1,2,3)$ to provide a difference error $c_i(=d_i'-d_i)$ at the subtractor 235. In FIGS. 3A and 3B, it is assumed that N is 3 and $I_1'$ to $I_3'$ and $I_1$ to $I_3$ represent intersections of the primary contour segment C'D' and the secondary contour segment CD with the lines drawn at sampling points $P_1'$ to $P_3'$ on the primary line segment C'D' and $P_1$ to $P_3$ on the secondary line segment CD, respectively. A set of difference errors for each primary contour segment is provided to the T & Q block 240 wherein the set of difference errors is transformed and quantized to provide a set of quantized transform coefficients.

Meanwhile, each set of quantized transform coefficients is converted into a set of reconstructed difference errors at the IT & IQ block 250 and provided to the adder 255, wherein the set of reconstructed difference errors is added to its corresponding set of secondary errors to provide a set of reconstructed primary errors to the contour reconstruction block 260. At the contour reconstruction block 260, a reconstructed current contour is generated based on the vertex data on the line L10 and the sets of reconstructed primary errors. Reconstructed current contour image data representing position information on vertices and contour pixels of the reconstructed current contour is provided from the contour reconstruction block 260 to the memory 270 and stored therein for the processing of a next contour.

At the statistical coder 245, each set of quantized transform coefficients is processed in the same fashion as in the intra-mode to provide the encoded error data for the sets of quantized transform coefficients to the MUX 290 via the line L80. In the inter-mode, the second control signal on the line L90 is provided to the MUX 290. In response thereto, the MUX 290 sequentially selects, among the signals on the lines, L20, L60, L70 and L80, the encoded error data on the line L80, the GMV on the line L20 and the vertex motion vector on the line L60; and provides same as encoded contour data for the current contour to the transmitter for the transmission thereof. At a decoder of a receiving end, the predicted vertex information, i.e., the vertex data from the switch 226 in the inter-mode, can be obtained by the GMV, the vertex motion vectors and the previous vertex information stored in a memory in the decoder; and the current contour can be reconstructed in an identical manner as in the contour reconstruction block 260.

While the present invention has been described with respect to the particular embodiments, it will be apparent to those skilled in the art that various changes and modifications may be made without departing from the scope of the invention as defined in the following claims.

What is claimed is:

1. A method for encoding a video signal of a current contour of an object based on a previous contour thereof, the previous contour having a predetermined multiplicity of previous vertices thereon, the method comprising the steps of:
   (a) mapping each of the previous vertices onto the current contour to form thereon a predicted vertex corresponding to said each of the previous vertices, wherein said mapping step includes the steps of:
      (a1) obtaining centroids of the previous and the current contours, the centroids being obtained by averaging positions of pixels on the respective contours;
      (a2) calculating a centroid displacement between the centroids;
      (a3) overlapping the previous and the current contours by shifting one of the contours to the other by the centroid displacement; and
      (a4) finding a pixel on the overlapped current contour closest to each of the previous vertices on the overlapped previous contour and setting the pixel as the predicted vertex, to thereby provide a multiplicity of predicted vertices, each of the predicted vertices corresponding to one of the previous vertices;
   (b) calculating vertex displacements between respective previous vertices and their corresponding predicted vertices, wherein each of the vertex displacements represents a displacement between each previous vertex on the overlapped previous contour and its corresponding predicted vertex on the overlapped current contour;
   (c) determining a plurality of current vertices on the current contour;
   (d) coding the current contour based on the current vertices to thereby provide intra-coded data;
   (e) coding the current contour with reference to the previous contour to provide inter-coded data; and
   (f) selecting, as encoded data for the current contour, either the intra-coded data or the inter-coded data based on the vertex displacements.

2. The method according to claim 1, wherein said selecting step (f) includes the steps of:
   (f1) comparing a magnitude of each vertex displacement with a predetermined threshold TH; and
   (f2) selecting the intra-coded data as the encoded data for the current contour if the number of the vertex displacements whose magnitudes are greater than TH is larger than a preset number P, and if otherwise, the inter-coded data, P being a positive integer.

3. The method according to claim 2, wherein the current vertices are determined by a polygonal approximation technique.

4. The method according to claim 2, wherein said step (d) includes the steps of:
   (d1) approximating the current contour with current line segments to thereby provide current approximation errors representing a difference between the current contour and a polygonal contour formed by the current line segments, each current line segment joining two adjacent current vertices on the current contour;
   (d2) transforming the current approximation errors to provide current transform errors; and
   (d3) providing the intra-coded data, the intra-coded data including the current transform errors and current vertex information representing positions of the current vertices.

5. The method according to claim 2, wherein said step (e) includes the steps of:
   (e1) approximating the current contour with primary line segments to thereby provide primary approximation errors representing a difference between the current contour and a polygonal contour formed by the primary line segments, each primary line segment joining two adjacent predicted vertices on the current contour;
   (e2) approximating the previous contour with secondary line segments to thereby provide secondary approximation errors representing a difference between the previous contour and a polygonal contour formed by the secondary line segments, each secondary line segment joining two adjacent previous vertices on the previous contour;
   (e3) finding difference errors representing differences between the primary and secondary approximating errors;
   (e4) transforming the difference errors to provide difference transform errors; and
   (e5) providing the inter-coded data, the inter-coded data including the difference transform errors and displacement information representing the vertex displacements and the centroid displacement.

6. A method for encoding a video signal of a current contour of an object based on a previous contour thereof, the previous contour having a predetermined multiplicity of previous vertices thereon, the method comprising the steps of:
   (a1) obtaining centroids of the previous and the current contours, the centroids being obtained by averaging positions of pixels on the respective contours;
   (a2) calculating a centroid displacement between the centroids;
   (a3) overlapping the previous and the current contours by shifting one of the contours to the other by the centroid displacement;
   (a4) finding a pixel on the overlapped current contour closest to each of the previous vertices on the overlapped previous contour and setting the pixel as the predicted vertex, to thereby provide a multiplicity of predicted vertices, each of the predicted vertices corresponding to one of the previous vertices;
   (b1) approximating the current contour with primary line segments to thereby provide primary approximation errors representing a difference between the current contour and a polygonal contour formed by the primary line segments, each primary line segment joining two adjacent predicted vertices on the current contour;
   (b2) approximating the previous contour with secondary line segments to thereby provide secondary approximation errors representing a difference between the previous contour and a polygonal contour formed by the secondary line segments, each secondary line segment joining two adjacent previous vertices on the previous contour;

(b3) finding difference errors representing differences between the primary and secondary approximating errors;

(b4) transforming the difference errors to provide difference transform errors; and (b5) providing inter-coded data, the inter-coded data including the difference transform errors.

7. The method according to claim 6, further comprising, after said step (b4), the steps of:

(c) calculating vertex displacements between respective previous vertices on the overlapped previous contour and their corresponding predicted vertices;

(d) determining a plurality of current vertices on the current contour;

(e) coding the current contour based on the current vertices to thereby provide intra-coded data; and (f) selecting, as encoded data for the current contour, one of the intra-coded data and the inter-coded data based on the vertex displacements.

8. The method according to claim 7, wherein said selecting step (f) includes the steps of:

(f1) comparing a magnitude of each vertex displacement with a predetermined threshold TH; and (f2) selecting the intra-coded data as the encoded data for the current contour if the number of vertex displacements whose magnitudes are greater than TH is larger than a preset number P, and, if otherwise, the inter-coded data, P being a positive integer.

9. The method according to claim 8, wherein said step (e) includes the steps of:

(e1) approximating the current contour with current line segments to thereby provide current approximation errors representing a difference between the current contour and a polygonal contour formed by the current line segments, each current line segment joining two adjacent current vertices along the current contour;

(e2) transforming the current approximation errors to provide current transform errors; and (e3) providing the intra-coded data, the intra-coded data including the current transform errors and current vertex information representing positions of the current vertices.

10. The method according to claim 8, wherein said inter-coded data further includes displacement information representing the vertex displacements and the centroid displacement.

11. The method according to claim 6, further comprising, after said step (b4), the steps of:

(c) calculating vertex displacements between respective previous vertices on the overlapped previous contour and their corresponding predicted vertices;

(d) comparing a magnitude of each vertex displacement with a predetermined threshold TH;

(e) selecting the inter-coded data as encoded data for the current contour if the number of vertex displacements whose magnitudes are not greater than TH is larger than a preset number P, P being a positive integer; and (f) if the number is greater than P, (f1) determining a plurality of current vertices on the current contour;

(f2) coding the current contour based on the current vertices to thereby provide intra-coded data; and (f3) providing the intra-coded data as the encoded data for the current contour.

12. An apparatus for encoding a video signal of a current contour of an object based on a previous contour thereof, the previous contour having a predetermined multiplicity of previous vertices thereon, the apparatus comprising:

means for determining a plurality of current vertices on the current contour;

means for obtaining centroids of the previous and the current contours, the centroids being obtained by averaging positions of pixels on the respective contours;

means for calculating a centroid displacement between the centroids;

means for overlapping the previous and the current contours by shifting one of the contours to the other by the centroid displacement;

means for finding a pixel on the overlapped current contour closest to each of the previous vertices on the overlapped previous contour and setting the pixel as the predicted vertex, to thereby provide a multiplicity of predicted vertices, each of the predicted vertices corresponding to one of the previous vertices;

means for calculating vertex displacements between the previous vertices and their corresponding predicted vertices, wherein each of the vertex displacements represents a displacement between each previous vertex on the overlapped previous contour and its corresponding predicted vertex on the overlapped current contour;

means for deciding a coding mode of the current contour base on the vertex displacements to thereby generate one of a first control signal representing an intra-mode and a second control signal representing an inter-mode;

means for selecting, as selected vertices, the current and the predicted vertices in response to the first and the second control signals, respectively; and means for encoding the current contour based on the selected vertices.

13. The apparatus according to claim 12, wherein said encoding means includes:

means for approximating the current contour based on the selected vertices to thereby provide primary approximation errors;

means for approximating the previous contour based on the previous vertices to thereby provide secondary approximation errors, wherein the secondary approximation errors are set to zero in response to the first control signal;

means for subtracting the secondary approximation errors from the primary approximation errors, respectively, to thereby provide difference errors;

means for transforming the difference errors to provide difference transform errors; and means for selecting, as encoded data for the current contour, the difference transform errors and the current vertex information representing positions of the current vertices in response to the first control signal and the difference transform errors and displacement information representing the vertex displacements in response to the second control signal.

14. A method for encoding a video signal of a current contour of an object based on a previous contour thereof, the previous contour having a predetermined multiplicity of previous vertices thereon and a previous centroid, the method comprising the steps of:

calculating a current centroid of the current contour;

calculating a global motion vector comprising a difference between the current centroid and the previous centroid;

shifting all pixels on one of the current and previous contours by the global motion vector so that the previous and current centroids are aligned with one another and the previous and current contours overlap;

selecting predicted vertices on said current contour corresponding to said previous vertices, each of said predicted vertices being a closest point on the current contour, to a previous vertex on said previous contour;

calculating a distance between each predicted vertex on the current contour and a corresponding previous vertex on the previous contour, and counting a number N of said distances greater than a predetermined threshold TH; and encoding said current contour based solely on pixels on said current contour, if N is greater than a second predetermined threshold P, and encoding said current contour based on pixels on said current contour and pixels on said previous contour, if N is not greater than said predetermined threshold P.

15. An apparatus for encoding a video signal of a current contour of an object based on a previous contour thereof, the previous contour having a predetermined multiplicity of previous vertices thereon and a previous centroid, the apparatus comprising:

means for calculating a current centroid of the current contour;

means for calculating a global motion vector comprising a difference between the current centroid and the previous centroid;

means for shifting all pixels on one of the current and previous contours by the global motion vector so that the previous and current centroids are aligned with one another and the previous and current contours overlap;

means for selecting predicted vertices on said current contour corresponding to said previous vertices, each of said predicted vertices being a closest point on the current contour, to a previous vertex on said previous contour;

means for calculating a distance between each predicted vertex on the current contour and a corresponding previous vertex on the previous contour, and counting a number N of said distances greater than a predetermined threshold TH; and means for encoding said current contour based solely on pixels on said current contour, if N is greater than a second predetermined threshold P, and encoding said current contour based on pixels on said current contour and pixels on said previous contour, if N is not greater than said predetermined threshold P.

\* \* \* \* \*